United States Patent [19]

Burgener, Jr. et al.

[11] 4,155,228
[45] May 22, 1979

[54] ONE-WAY CLUTCH FOR AUGER AGITATOR

[75] Inventors: Frank R. Burgener, Jr.; Reinhold A. Drews, both of Stevensville; John W. Pielemeier, St. Joseph; Harry J. Rasmussen, Three Rivers, all of Mich.

[73] Assignee: Whirlpool Corporation, Benton Harbor, Mich.

[21] Appl. No.: 833,915

[22] Filed: Sep. 16, 1977

Related U.S. Application Data

[63] Continuation of Ser. No. 686,135, May 13, 1976, abandoned.

[51] Int. Cl.² .................. D06F 13/06; F16D 11/00
[52] U.S. Cl. ........................... 68/133; 68/134; 192/30 V; 192/46
[58] Field of Search ............... 68/131–134, 68/23.6, 23.7, 28, 38, 53, 54, 89, 184; 416/124, 169, 172; 74/126; 192/30 V, 46, 41 R

[56] References Cited

U.S. PATENT DOCUMENTS

| 577,490 | 2/1897 | McGuire et al. | 192/46 |
| 1,694,810 | 12/1928 | Dunham | 192/41 R |
| 1,817,660 | 8/1931 | Winther et al. | 192/46 X |
| 2,675,898 | 4/1954 | Morgan | 192/41 R |
| 2,869,700 | 1/1959 | Bowden | 192/30 V X |
| 3,314,257 | 4/1967 | Fosler et al. | 68/23.3 |
| 3,565,223 | 2/1971 | Pierce | 192/30 V X |
| 3,987,651 | 10/1976 | Platt | 68/133 |

FOREIGN PATENT DOCUMENTS 1259826 2/1968 Fed. Rep. of Germany ............. 68/134
1420081 1/1976 United Kingdom ..................... 192/46

Primary Examiner—Philip R. Coe
Attorney, Agent, or Firm—Hill, Gross, Simpson, Van Santen, Steadman, Chiara & Simpson

[57] ABSTRACT

A vertical-axis, automatic washing machine has a central drive shaft for oscillatably driving a first agitator portion with a clutch member splined thereto. The clutch has downwardly-facing teeth having drive surfaces and slip surfaces. An auger or second agitator portion coaxial with the first agitator portion has cooperating upwardly-facing teeth. Upon a drive or forward oscillation of the drive shaft and first agitator portion, the drive surfaces engage one another to drive the auger portion in a stepwise rotation. During an opposite rotation of the first agitator portion, the slip surfaces engage one another and, where the contents of the washer basket retards a reverse movement of the auger, the teeth will slip past one another, with the clutch member reciprocating vertically upon its splined connection. An annular cushioning member placed between the clutch and the agitator parts cushions impacts between the teeth during such reciprocations by controlling the depth of tooth engagement. Thus, noise otherwise normally produced during ratcheting of the clutch is substantially reduced.

4 Claims, 13 Drawing Figures

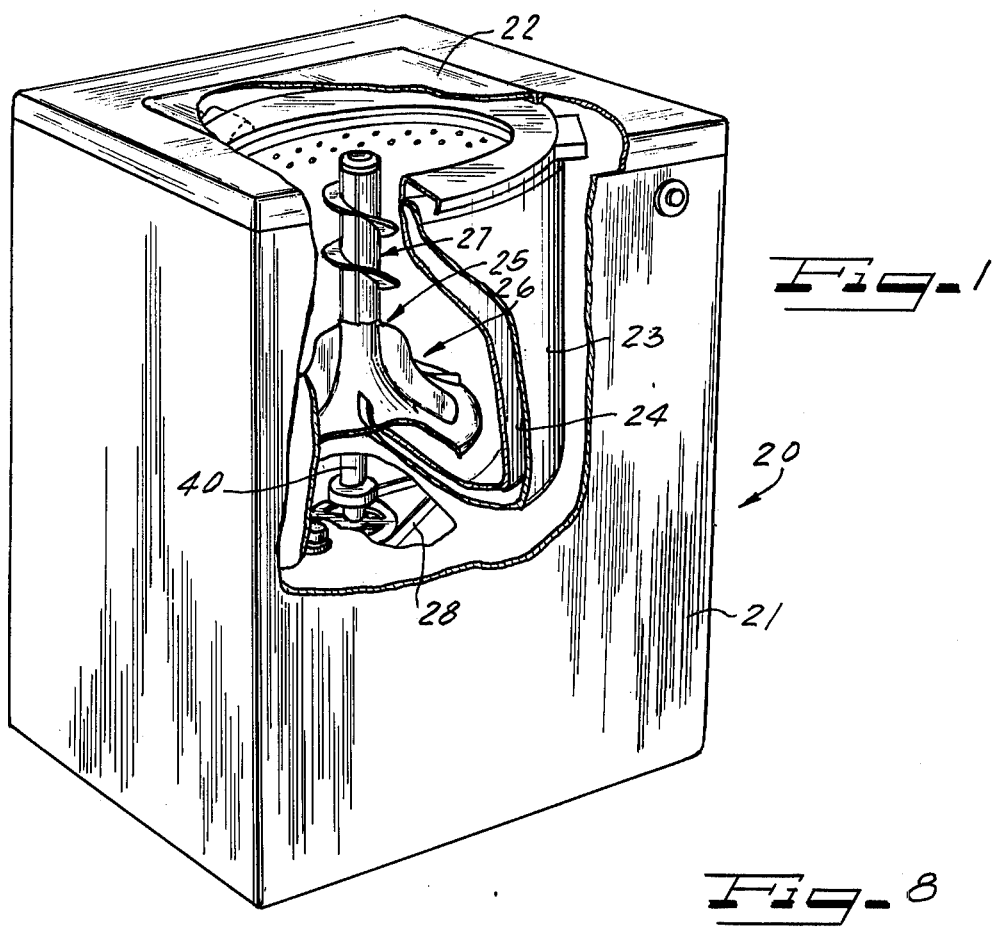
Fig. 1
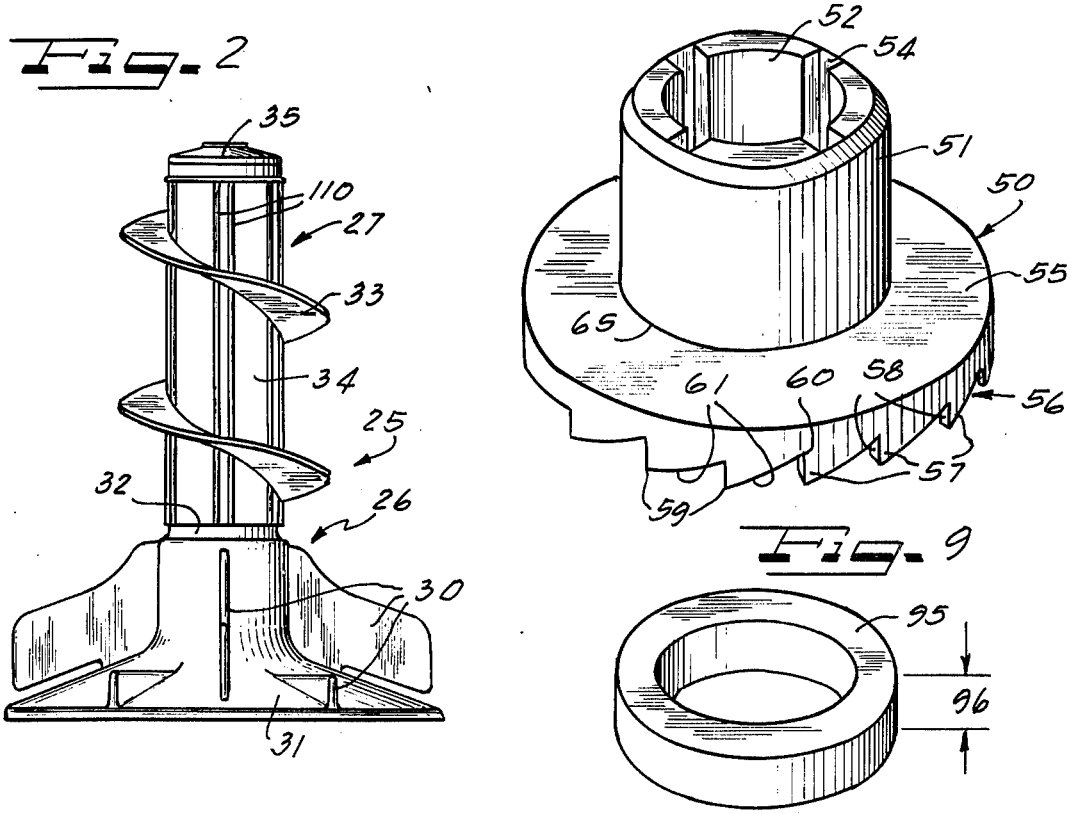
Fig. 2
Fig. 8
Fig. 9

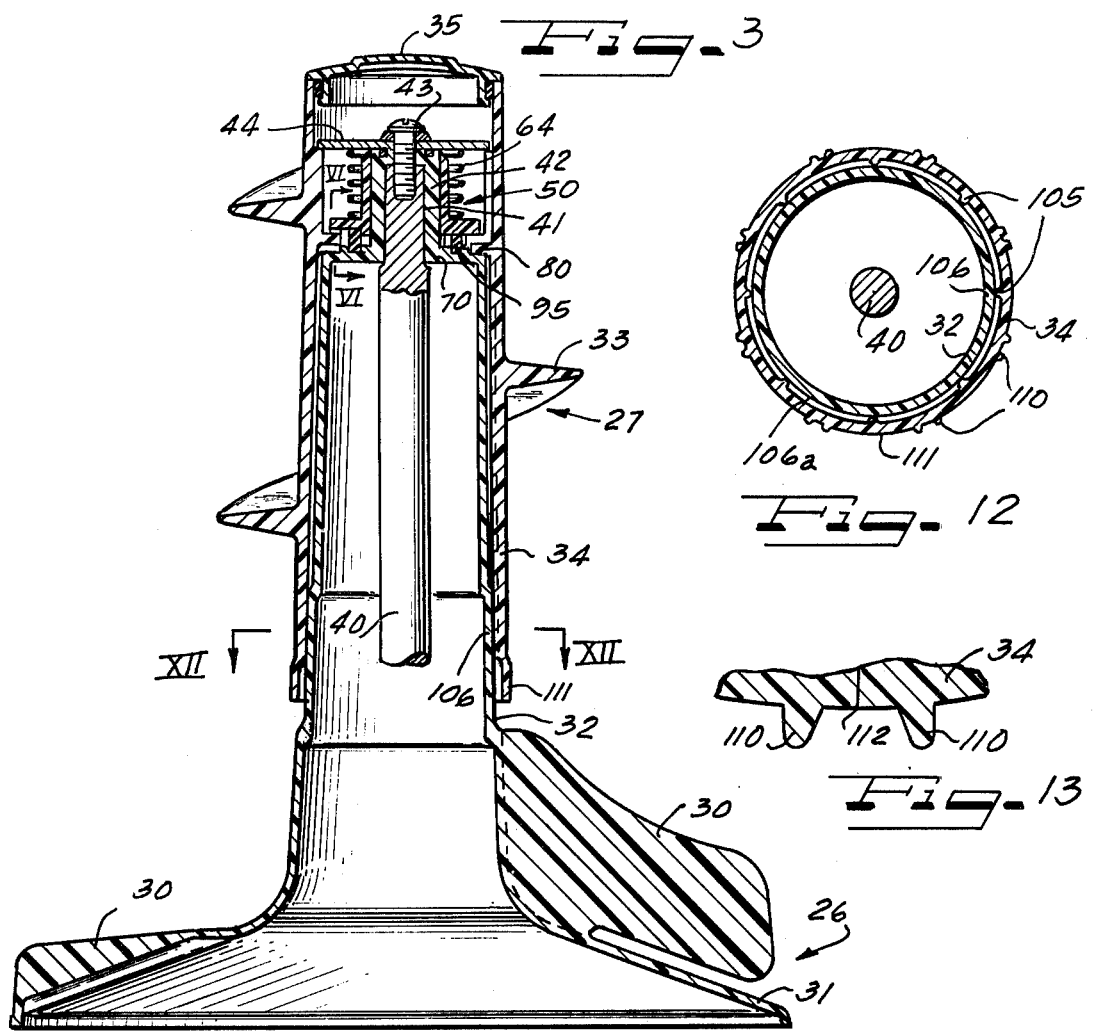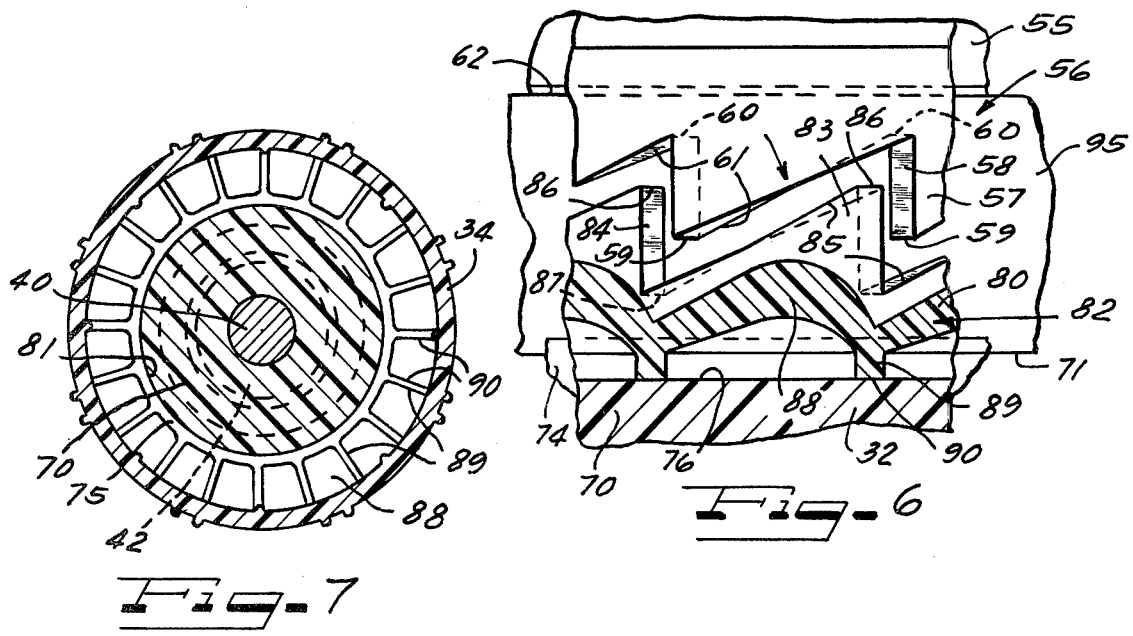

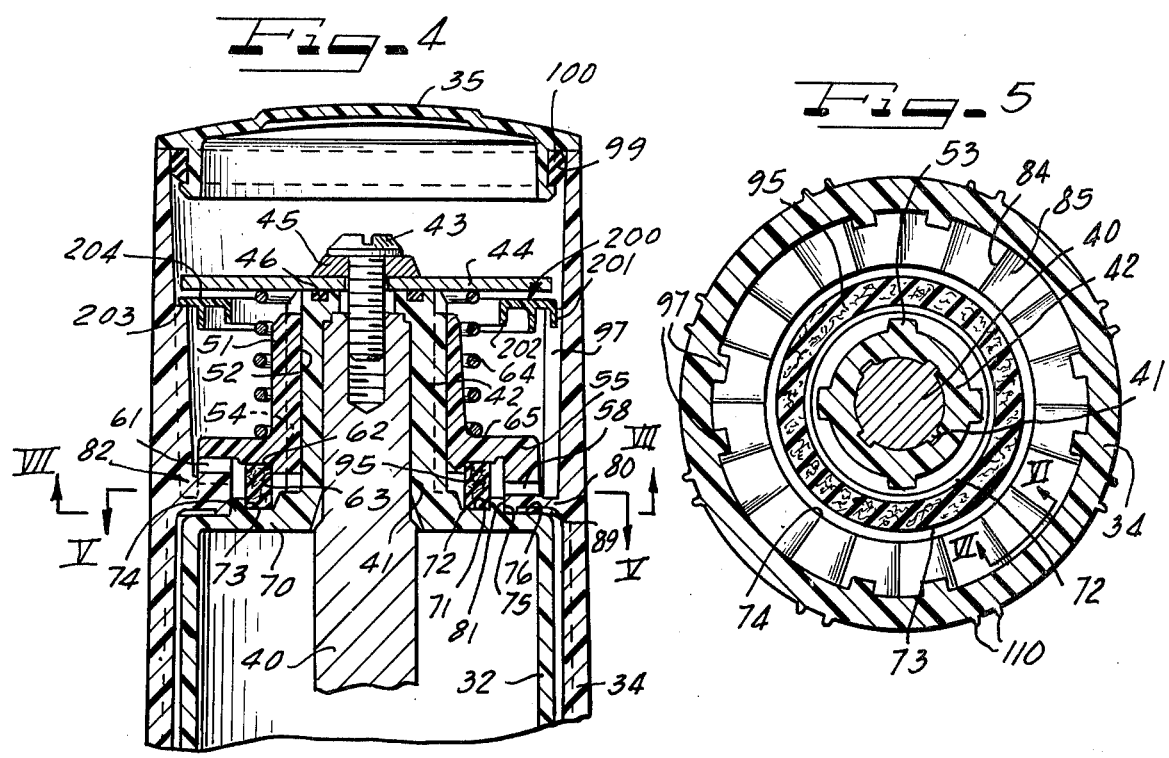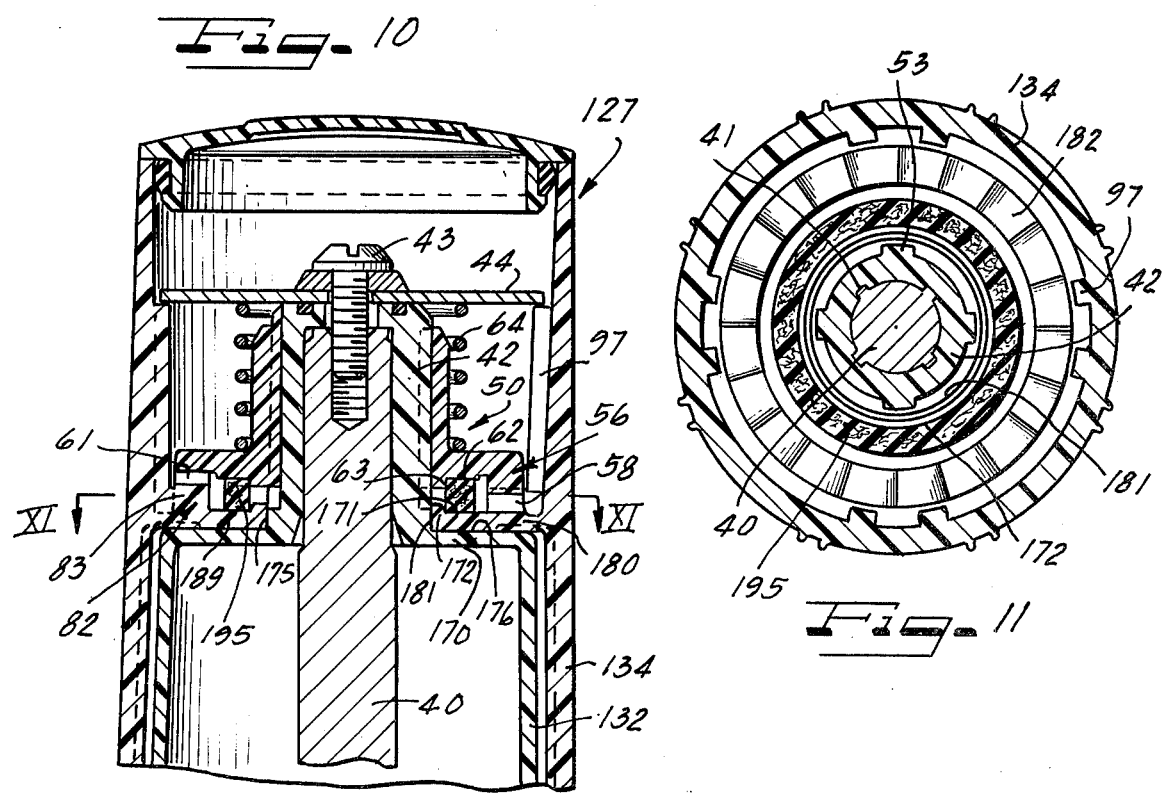

ONE-WAY CLUTCH FOR AUGER AGITATOR

This is a continuation of application Ser. No. 686,135, filed May 13, 1976 and now abandoned.

BACKGROUND OF THE INVENTION

1. Field of the Invention

The invention relates to apparatus for changing oscillatory rotary motion to stepwise unidirectional rotary motion.

2. The Prior Art

A double action agitator generally includes a first portion which oscillates in to-and-fro motions and a second or upper auger portion which rotates in unidirectional, stepwise motions. The oscillating first agitator portion includes a lower skirt portion and an upper barrel portion, the skirt portion carrying scrubbing vanes. The auger, carrying helical vanes, creates a downflow adjacent the agitator barrel in the wash receptacle and thereby causes positive rollover of the clothes being washed. Several co-pending patents assigned to assignee of the present invention, namely, U.S. Pat. Nos. 3,987,508; 3,987,651; and 3,987,652, disclose the use of ratchet-type, spring-biased toothed clutches upon the oscilating drive shaft or a central portion of the oscillating agitator, whereby oscillatory motions drive the auger forward in one direction and allow slipping of the auger in the reverse direction. U.S. Pat. No. 1,694,810 depicts a clutch construction which now is in the public domain and as to which the present invention is an improvement. Noise produced by the ratcheting of the clutch members is often objectionably loud in such prior art devices.

U.S. Pat. No. 3,314,257 shows the use of a rubber isolator pad 112 in a non-ratcheting clutch arrangement to dampen the transmission of sound from the clutch to the spin shaft in an automatic washer. U.S. Pat. No. 2,675,898 discloses a unidirectional, non-ratcheting drive coupling having an annular, resilient bumper ring 39.

U.S. Pat. No. 1,694,810 to Dunham discloses a clutch arrangement for a laundry machine wherein a pair of clutch members including ratchet teeth are utilized in the superstructure of the machine's transmission to cause rotation of a receptacle during a centrifuging operation and to insure a stationary positioning of the receptacle during other operations, the rotation or stationary positioning of the receptacle determined by the rotational direction of a drive shaft fixed to one of the clutch members. The clutch members according to the Dunham disclosure do not override their ratchet teeth and are not interconnected in a driving relationship with the agitator of the appliance.

SUMMARY OF THE INVENTION

In accordance with this invention, an automatic washing machine of the vertical axis type has a double action agitator including a clutch member splined to the oscillating agitator portion for oscillation therewith and axial reciprocation with respect thereto. The clutch member carries annularly-arranged teeth, each of the teeth having a vertical drive surface and an inclined slip surface. The auger agitator portion includes a generally horizontal surface for riding upon a corresponding surface of the oscillating agitator portion axially below said clutch member. Upwardly-facing teeth are formed upon the auger portion of the agitator in a driven relationship therewith. The clutch member is spring-biased into engagement with the auger portion of the agitator, said engagement being through the respective teeth of each. An annular cushioning ring spaced radially from the teeth bears upon and between both the clutch member and a surface adjacent the driven teeth. The cushioning ring controls the depth of engagement of the two sets of teeth and absorbs axial impacts upon slipping of the teeth past one another, substantially reducing the generation of noise thereby.

BRIEF DESCRIPTION OF THE DRAWINGS

FIG. 1 is a general perspective view of an automatic washing machine with parts thereof cut away to show a double action agitator within a wash basket thereof.

FIG. 2 is an elevational view of a double action agitator which may include the present invention.

FIG. 3 is a side sectional view through a double action agitator similar to that of FIG. 2 and showing the internal relation of parts including the clutch of the present invention.

FIG. 4 is a detailed side sectional view of the top portion of the double action agitator of FIG. 3, showing the clutch mechanism and related parts.

FIG. 5 is an axial view on line V—V of FIG. 4, through the teeth and cushioning means of the clutch arrangement.

FIG. 6 is a radially-inward view on line VI—VI of FIG. 5.

FIG. 7 is an axial section view on line VII—VII of FIG. 4.

FIG. 8 is a perspective view of the clutch member of the present invention.

FIG. 9 is a perspective view of the cushioning member of the present invention.

FIG. 10 is similar to FIG. 4 but shows an alternate embodiment of the invention.

FIG. 11 is a sectional view on line XI—XI of FIG. 10.

FIG. 12 is a view on line XII—XII of FIG. 3, showing bearing ribs between portions of the first and second agitator members.

FIG. 13 is a detailed sectional view through protective ribs formed on the outside of the auger agitator member.

DESCRIPTION OF THE PREFERRED EMBODIMENT

An automatic washing machine of the vertical axis type is shown generally at 20 in FIG. 1. The washer 20 comprises a cabinet 21 having a top access door 22 and containing a washer tub 23 and a clothes basket 24. A double action agitator 25 within the basket 24 comprises a first agitator portion or oscillator portion 26 and a second agitator portion or auger portion 27. The tub 23, basket 24, and oscillator and auger portions 26 and 27, respectively, of the agitator 25 are all coaxial. Drive means 28 are connected to drive the various internal machine components during wash and liquid extraction operations.

As shown in FIG. 2, the double action agitator 25 has a plurality of scrubbing vanes 30 affixed to the oscillator portion 26 upon and adjacent a skirt portion 31 thereof. The first or oscillator portion 26 of the agitator has a central barrel portion 32 which extends upwardly from the skirt 31 and is encompassed by the auger agitator portion 27. The auger portion 27 has a helical vane 33 extending outwardly from a cylindrical barrel portion 34 thereof. The double action agitator 25 is closed at the top of the barrel 34 of the auger portion 27 by a cap 35.

FIG. 3 shows, in vertical cross-section, the double action agitator 25 which features an oscillatory motion of the first agitator portion or oscillator 26 and a stepwise, unidirectional motion of the second agitator portion or auger 27. The drive means 28 is connected to oscillate a drive shaft 40 which extends axially through the upright center portions 32 and 34 of the agitator portions 26 and 27 respectively. The drive shaft 40 is splined vertically at an upper end thereof into a stem portion 42 of the oscillator 26, the stem portion 42 having a cooperatively splined interior surface for receiving a shaft spline 41. As shown in FIG. 4, a machine screw 43 clamps the stem 42 of the oscillator agitator portion 26 to the upper end of the drive shaft 40, by acting through a plate 44 and seals 45, 46. The seal 46 is an O-ring type seal, between the stem 42 and the plate 44, while the seal 45 is a somewhat resilient washer-type seal between the plate 44 and the head of the machine screw 43. These seals prevent leakage of air from the interior of the oscillator's barrel portion 32 and cause formation of an air dome therewithin for preventing wash liquid from rising within the dome to the same level as the liquid in the tub.

In accordance with the principles of the present invention, as best shown in FIG. 4, a clutch member 50 is engaged with an exterior surface of the stem 42 of the oscillator agitator barrel portion 32. The clutch member 50 comprises an upstanding annular portion 51 having an inner surface 52 which is engaged with the stem 42. A plurality of vertical splines 53 formed on the exterior surface of the stem 42 engage slots 54 formed within the inner surface of the upstanding portion 51 of the clutch member 50. The splines 53 and slots 54 permit axial movement of the clutch member 50 with respect to the stem 42 while assuring co-rotation of the parts.

A lower portion of the clutch member 50 comprises a clutch disc portion 55 having, on a lower surface thereof, a first engagement means 56 comprising an annular or peripheral row of downwardly facing ratchet teeth 57. Each tooth 57 has a drive surface 58 which is substantially vertical. Joining a peak 59 of one tooth 57 to a base 60 of an adjacent tooth is an inclined slip surface 61.

The disc portion 55 of the clutch member 50 further has on its lower surface, radially inwardly of the first engagement means 56, a horizontal, annular surface 62 defined at its radially inward extend by a shoulder 63. The clutch member 50 is urged in a downward direction by a coil spring 64 which bears between an upper surface of the clutch disc 55 as at 65 and an under surface of the plate 44 which is clamped atop the stem 42 by the machine screw 43.

The stem 42 is attached to the barrel 32 of the oscillator agitator 26 by means of a horizontal portion 70. In the embodiment of FIG. 4, an upper surface of the horizontal portion 70 has a horizontal, annular surface 71 defined by radially inner and outer shoulders 72 and 73, respectively. Radially outwardly of the shoulder 73 is a spacing ridge 74 having a radially-outwardly facing surface 75. This surface 75 terminates at a lower portion at an annular bearing surface 76 which extends outwardly to a shoulder at the outer diameter of the barrel 32 of the oscillator agitator 26.

The auger 27 includes a radially inwardly-extending, generally horizontal portion 80. This portion 80 extends radially inwardly to an abutment and bearing surface 81 which bears against the radially outwardly-facing surface 75 of the horizontal portion 70 of the oscillator agitator 26. As depicted in FIG. 6, the inwardly-extending portion 80 of the auger agitator 34 has a plurality of upwardly-facing teeth comprising a second engagement means 82. The second engagement means 82 comprises a plurality of upwardly-facing teeth 83, each having a generally vertical driven surface 84 and an inclined slip surface 85 extending from a peak 86 of one tooth 83 to a base portion 87 of the next adjacent tooth 83. The configuration of the teeth 83 of the second engagement means 82 corresponds to that of the teeth 57 of the first engagement means 56. As shown in FIG. 6, a web portion of the horizontal extension 80 is formed as a series of hills 88 having both horizontal and vertical components; the hills 88 increase the strength of the portion 80 as against vertical and torsional loads and allow a closer approach to uniform wall thickness throughout the portion 80. On an under surface of the inwardly-extending portion 80 is a plurality of radially-extending bearing and scraping ribs 89. Each rib 89 has a substantially flat lower surface 90 which bears upon the annular surface 76 of the horizontal portion 70 of the oscillator agitator portion 26. The scraping action of the ribs 89 keeps the surface 76 clean and directs foreign matter radially outwardly from the abutment surfaces 75, 81.

In accordance with the principles of the present invention, a cushioning member 95 is provided between the clutch member 50 at its annular horizontal abutment surface 62, outwardly of shoulder 63, and the annular surface 71 upon the horizontal portion 70 of the oscillator agitator portion 26. The cushioning member 95 is an energy absorbing material which may be compressible such as for example, SAE F-6 felt and has a vertical dimension 96 as shown in FIG. 9, under load, such that surfaces 61 and 85 do not strike each other as the clutch member 50 reciprocates with respect to the agitator portions 26 and 27. Thus the cushioning member 95 prevents full-depth tooth engagement and thereby prevents initial vertical impact between the inclined tooth surfaces 61 and 85. The surfaces 61 and 85 contact each other only upon sufficient counterclockwise rotation of the clutch member 50, and this is a generally sliding contact rather than a potentially noise-generating impact. The cushioning member 95 substantially reduces or eliminates the noise of axial impact and absorbs the energy of that impact as the first and second engagement means 56, 82 slip past one another upon each reverse oscillation.

On the interior of the auger agitator barrel 34, above the inwardly extending portion 80, are a plurality of inwardly-projecting ribs 97. Each rib 97 extends vertically, substantially from the inwardly-extending portion 80 to define an upper shoulder portion 98. The upper shoulders 98 may be contactable against the lower surface of the spring plate 44 to limit upward movement of auger agitator portion 27 with respect to agitator portion 26 thereby ensuring the required axial proximity of the two sets of ratchet teeth 58 and 61.

A bearing plate 200 may optionally be provided as shown in FIG. 4. The bearing plate may be constructed of a plastic material such as acetal which provides a suitable bearing surface for contact with the spring plate 44. The annular bearing plate 200 includes an upwardly-facing bearing surface 204 and downwardly-extending annular strengthening ribs 202 for providing rigidity to the bearing surface 204. The bearing plate rests, through portions 203 of its periphery, on the upper shoulders 98 of the ribs 97; and the bearing plate includes at least one downwardly-extending peripheral tab 201 adapted to fit between adjacent ribs 97 so as to prevent rotation of the bearing plate with respect to the axis of the agitator. The bearing plate therefore sits within the auger agitator portion 27 and is substantially immovable with respect thereto once the spring plate 44 is fastened in place by machine screw 43 on the barrel portion 32 of the agitator portion 26, as the agitator portion 27 rotates with respect to the agitator portion 26 and the bearing surface 204 of the bearing plate 200, rather than the shoulders 98 of the ribs 97, will provide the contact surface for movement against the under surface of the spring plate 44. By providing a bearing plate in this manner undesirable wear on the ribs 97 due to the relative movement between agitator portion 27 and agitator portion 26 (including spring plate 44) will be avoided.

Upwardly of the ribs 97 is an annular, radially inwardly-inclined shoulder 99 which retains a seal ring 100 fitted about a lower portion of the agitator cap 35. The seal 100 makes the interior of the auger agitator portion 27 into an air dome to restrict the rise of water and particles contained therein upwardly between the oscillator agitator barrel portion 32 and the auger barrel portion 34.

It is also a feature of the present invention that the portion of the auger agitator barrel 34 below the inwardly-extending portion 80 is provided on its interior surface with bearing ribs 105 which are spaced apart peripherally about the interior of the barrel 34. The barrel portion 32 of the oscillator agitator 26 has a shoulder portion 106 of enlarged diameter near the lower end of the auger barrel portion 34 which portion 106 includes an outwardly-facing surface 106a against which these ribs 105 may bear. These ribs 105 and the surface 106a maintain the barrel portions 32 and 34 in a generally coaxial relation, just as the ribs 89 beneath the inwardly extending portion 80 bear upon the upper surface 76 of the horizontal portion 70 of the oscillator agitator barrel portion 32. Further, as shown in FIG. 13, the exterior of the auger agitator barrel portion 34 is provided with a plurality of paired vertical ribs 110, 110 which extend substantially from the cap 35 to a slightly flared lower portion 111 of barrel portion 34. The ribs 110 keep fabrics away from mold parting lines 112 which can present sharp projections which are difficult to remove economically following the molding process and may tend to snag fabrics in the absence of the ribs 110.

An alternative embodiment of the invention is shown in FIGS. 10 and 11. In these figures, parts identical to those shown in FIGS. 4 and 5 have identical numbers, while those parts which are modified in the second embodiment have corresponding numbers. In the alternate embodiment, an inwardly-extending horizontal portion 180 of the auger agitator barrel portion 134 extends radially inwardly below and beyond the cushion member 195 to abut at 181 against an axially facing shoulder 175 on a horizontal portion 170 of the oscillator agitator barrel portion 132. The lower, radially-ribbed surface 189 of the horizontal portion 180 of the auger agitator 127 bears upon an extended annular upper surface 176 of the horizontal portion 170. An upper surface of the horizontal portion 180 of the auger agitator barrel portion 34 is formed with second engagement means 82, comprising an annular row of upwardly-facing ratchet teeth 83 cooperable with the first engagement means 56 of the clutch member 50. Radially inwardly of the second engagement means 82 is located the cushioning member 195, which abuts the annular surface 62 on the underside of the clutch member 50 radially outwardly of a shoulder 63 thereon as in FIG. 4-5. The cushion member 195 rides at its lower surface upon a horizontal annular surface 171 of the auger agitator portion 180, outwardly of a shoulder 172 thereon.

In the alternate embodiment of FIG. 10 and 11, the cushion member 195 is located directly between the members carrying the first and second engagement means, thereby affording several advantages. First, such an arrangement more precisely controls the depth of ratchet tooth engagement so as to more effectively limit tooth-to-tooth impact when the clutch is slipping upon reverse oscillation. Because the clutch 50 and auger portion 180 will rotate relative to one another during the washing cycle, the cushion 195 will also somewhat damp rotational tooth impact. Finally, vibration carried through the drive shaft 40 and into the oscillator agitator 26 will be damped somewhat in being transmitted to the auger agitator 127 by the pressure of the cushion 195 upon the member 180. On the other hand, since relative rotation exists across the cushion member 195, that member must have a sufficiently low friction coefficient against the adjacent parts to permit slippage of the clutch on reverse oscillations at a desired torque, and the cushion must also resist abrasion sufficiently to have a useful service life. However, it should be noted in this regard that replacement of the cushion member 195 is readily accomplished by removal of the cap 35 and the machine screw 43 and slipping out the clutch member 50 for access thereto.

Operation of the one-way clutch mechanism will now be described with reference to the embodiment shown in FIGS. 4 and 5, although the description also applies generally to the alternative embodiment shown in FIGS. 10 and 11. In operation, the drive means 28 imparts an oscillatory motion, in clockwise and counterclockwise directions, to the drive shaft 40. The shaft 40 is connected through the spline 41 to the stem 42, so that the oscillator agitator portion 26 and the scrubbing vanes 30 thereon oscillate in to-and-fro motions. The clutch member 50 oscillates via its splined connection with the stem 42 and carries first engagement means 56. Downwardly facing teeth 57 of the first engagement means 56 engage upwardly-facing teeth 83 of the second engagement means 82 on the inwardly-extending support and driven portion 80 of the auger agitator barrel portion 34. When the oscillator agitator 26 is driven in a clockwise direction, the drive faces 58 of the first engagement means 56 engage against driven faces 84 of the second engagement means 82 on the auger agitator. The auger vane 33 is thereby rotated clockwise, imparting a downward motion to wash liquid and items to be washed adjacent the agitator barrel.

Upon reverse rotation of the oscillator agitator 26, the slip surfaces 61 of the first engagement means will bear against the slip surfaces 85 of the second engagement means 82 under the downward bias of coil spring 64 upon the clutch member 50. Although such engagement between the slip surfaces 61 and 85 will tend to rotate the auger 27 in a reverse or counterclockwise direction, such motion will be resisted by the contact of the wash fluid and particularly the items to be washed against the vane 33. Where the wash load is heavy, and forces resisting reverse motion of the auger 27 are greater than those between the slip surfaces 61, 85, the clutch member 50 will rise as the surfaces 61,85 slip past one another. The clutch member 50 will reciprocate on the splines 53, with the clutch member first moving in an upward direction until the peaks 59 of the first engagement means 56 reach the peaks 86 of the second engagement means 82. Then continued counterclockwise motion of the oscillator agitator portion 26 will carry the first engagement means 56 further to the right in FIG. 6, causing surface 62 to move downwardly to contact the upper surface of the cushioning member 95. During such downward movement the cushion member 95 is compressed between the clutch member 50 and the lower support surface 71, absorbing released energy from the spring 64, preventing axial impact between the surfaces 61,85 and eliminating the noise which would otherwise result from such impact. Additional counterclockwise rotation of the agitator portion 26 will cause first engagement means 56 and the clutch member 50 to continue downward movement until surfaces 61,85 engage one another. This ratcheting of the teeth and reciprocating of the clutch member will continue in response to the continued oscillation of the agitator portion 26.

Thus, upon completion of a reverse oscillatory motion of the oscillator agitator portion 26, the clutch member 50 including the first engagement means 56 will again be moved in a clockwise direction, so that the drive surfaces 58 will again engage against the driven surfaces 84. The cushioning member 95 will not generally be fully compressed to permit full engagement between the faces 58 and 84, i.e., with the peaks 59 of the teeth 57 touching the bases 87 of the teeth 83; however, engagement between only portions of the surfaces 58 and 84 is sufficient to rotate the auger.

It is important to note that unidirectional movement of the auger agitator portion 27, and thus operation of the auger vane 33, is selective depending upon the size of the load being washed. In the case of small, loosely packed loads, little resistance to rotational movement of the auger agitator portion in the non-driving direction will be present, and thus the auger will tend to be oscillated together with the oscillator agitator. As the size of the wash load relative to the space within the basket 24 increases more resistance will be offered to reverse rotational movement of the auger, and the one-way clutch assembly will begin to operate. With large loads packed into the basket 24, the one-way clutch assembly will operate continuously and the second agitator member or auger will provide the required augering action to insure adequate rollover of the clothes load. Such selective operation is especially desirable since lack of clothes rollover has been a particular problem with large, closely packed loads.

Other variations in the structure described above are, of course, possible. For example the clutch member 50 could be driven directly by the drive shaft 40 rather than by a stem 42 of the agitator barrel portion 32. Also, the clutch member 50 could be splined to the auger 27 rather than to the agitator portion 26, with ratchet teeth then being formed on an upper face portion of the horizontal surface 76. Although these and various other modifications might be suggested by those versed in the art, it should be understood that we wish to embody within the scope of the patent warranted hereon all such modifications as reasonably and properly come wthin the scope of our contribution to the art.

The embodiments of the invention in which an exclusive property or privilege is claimed are defined as follows:

1. In a washing machine having a receptacle for containing a load of items to be washed, a double action agitator mounted within said receptacle for scrubbing said items and for providing an augering action to facilitate rollover of said items in the presence of a sufficient quantity of items within said receptacle, and drive means for driving said double action agitator; said double action agitator including a first agitator member oscillated by said drive means about an axis, a second agitator member rotatably mounted on said first agitator member and including a helical vane for imparting a rollover movement to said items, and clutch means responsive to the oscillatory movement of said first agitator member for unidirectionally driving said second agitator member; said clutch means comprising:
  a clutch member mounted on said first agitator member for axial movement with respect thereto and for oscillation therewith in a driving and in a non-driving direction, said clutch member including a plurality of downwardly-facing ratchet teeth each forming a first tooth drive surface and a second tooth slip surface;
  a plurality of upwardly-facing ratchet teeth formed on said second agitator member each defining a first tooth surface and a second tooth surface, said first surfaces of said upwardly-facing teeth engageable with said first surfaces of corresponding downwardly-facing teeth in response to driving movement of said clutch member, said second surfaces of said upwardly-facing teeth being slidable along said second surfaces of adjacent downwardly-facing teeth in response to non-driving movement of said clutch member and a resistance to rotation of said second agitator member caused by sufficient contact with said items to be washed, said clutch member reciprocating axially with respect to said second agitator member in response to said sliding movement between said ratchet teeth;
  a spring mounted and retained adjacent said clutch member for biasing said clutch member downwardly against said second agitator member; and
  a cushioning member between said clutch member and one of said first and second agitator members for cushioning the contact between adjacent second tooth surfaces of said upwardly-facing and said downwardly-facing ratchet teeth as said clutch member reciprocates; and wherein
  said first agitator member further comprises a horizontal, annular support surface; and
  said second agitator member further comprises a horizontal, annular portion extending in overlying relationship to said support surface of said first agitator member, the horizontal portion having an undersurface, and a plurality of radial ribs formed upon said undersurface of said horizontal portion of said second agitator member in slidable contact with said annular support surface of said first agitator member.

2. In a washing machine as defined in claim 1, wherein said first agitator member comprises an external annular portion and said second agitator member includes a downwardly-extending, annular barrel portion and a plurality of inwardly-extending ribs formed thereupon, said ribs bearing upon said external annular portion of said first agitator member.

3. In a washing machine as defined in claim 1, wherein said second agitator member includes an outer surface and a plurality of pairs of radially outwardly projecting ribs and a plurality of mold parting lines each located between the ribs of each of said pairs of ribs on said outer surface, said ribs protecting articles being washed from contact with said mold parting lines.

4. In an automatic washing machine having an oscillating agitator including a top portion, clutch means for driving in stepwise unidirectional rotation from said oscillating agitator a cylindrical, helically-vaned auger agitator, said clutch means comprising, in combination:

an annular cushion;
a clutch member splinedly engaged with said top portion of said oscillating agitator for oscillation therewith and axial reciprocation with respect thereto, said clutch member comprising:
first engagement teeth arranged annularly upon said clutch member, each of said teeth having a generally vertical drive surface and an inclined slip surface, and
a first annular horizontal cushion bearing surface spaced radially from said first teeth and having shoulder means for engaging said cushion;
said auger agitator having an inwardly-extending horizontal portion,
the horizontal portion having an undersurface and bearing and wiping ribs formed on said undersurface thereof;
said oscillator agitator having an upper horizontal surface spaced axially below said clutch member and engaging the ribs of the horizontal portion;
radial abutment means formed on said horizontal portion for spacing said auger agitator coaxially about said oscillating agitator upon said upper horizontal surface thereof;
said horizontal portion having second engagement teeth cooperable with said first engagement teeth of said clutch member and having corresponding but oppositely-facing vertical driven surfaces and inclined slip surfaces;
a second annular horizontal cushion bearing surface formed upon one of the horizontal portion of the auger agitator and the upper horizontal surface of the oscillating agitator;
said cushion member being annular in shape and having oppositely-disposed first and second annular surfaces engaging both said cushion bearing surface of said clutch member and said second annular bearing surface both during drive motions and during a portion of said slipping motions of said oscillating agitator as said clutch member reciprocates axially as said first and second teeth slip past one another upon the inclined slip surfaces thereof, the cushion being compressible axially to absorb axial impact loads therebetween; and
spring bias means biasing said clutch member of said auger agitator against said cushion member,
thereby to provide a double action agitator with a relatively noisefree ratchet-type clutch.

* * * * *